US010008144B2

(12) United States Patent
Kim et al.

(10) Patent No.: US 10,008,144 B2
(45) Date of Patent: Jun. 26, 2018

(54) DISPLAY APPARATUS AND A METHOD OF DRIVING THE SAME

(71) Applicant: SAMSUNG DISPLAY CO., LTD., Yongin-si, Gyeonggi-Do (KR)

(72) Inventors: Yun-Mi Kim, Changwon-si (KR); Ki-Hyun Pyun, Gwangmyeong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 53 days.

(21) Appl. No.: 15/162,178

(22) Filed: May 23, 2016

(65) Prior Publication Data

US 2016/0358529 A1 Dec. 8, 2016

(30) Foreign Application Priority Data

Jun. 3, 2015 (KR) ........................ 10-2015-0078671

(51) Int. Cl.
*G09G 3/20* (2006.01)
*G09G 3/36* (2006.01)
*G09G 5/02* (2006.01)
*G09G 5/06* (2006.01)
*G06K 9/62* (2006.01)

(52) U.S. Cl.
CPC ......... *G09G 3/2018* (2013.01); *G09G 3/2007* (2013.01); *G09G 3/2077* (2013.01); *G09G 3/2092* (2013.01); *G09G 3/3611* (2013.01); *G09G 2310/0248* (2013.01); *G09G 2310/08* (2013.01); *G09G 2320/0242* (2013.01)

(58) Field of Classification Search
CPC combination set(s) only.
See application file for complete search history.

(56) References Cited

U.S. PATENT DOCUMENTS 4,301,466 A * 11/1981 Lemoine .................. H04N 9/64 348/539
4,921,334 A * 5/1990 Akodes ................ G09G 3/2011 345/89
6,825,834 B2 * 11/2004 Miyajima ........... G02F 1/13624 345/204

(Continued)

FOREIGN PATENT DOCUMENTS

JP 2001-142428 5/2001
JP 2001-147669 5/2001

(Continued)

*Primary Examiner* — Wesner Sajous
(74) *Attorney, Agent, or Firm* — F. Chau & Associates, LLC

(57) ABSTRACT

A display apparatus includes a display panel, a memory, a bit-data convertor, a switch, and a gate driver. The display panel includes pixels. Each pixel is connected to one of the data lines and one of the gate lines. The memory stores a plurality of image data corresponding to a frame period. The bit-data convertor determines a plurality of bit data. Each of the bit data corresponds to a degree of change between adjacent image data among the plurality of image data, obtains a sum of the bit data, and outputs the sum of the bit data as a total count bit data value. The switch outputs a first pulse control signal corresponding to the total count bit data value. The gate driver generates a gate signal based on the first pulse control signal, and to output the gate signal to one of the gate lines.

20 Claims, 8 Drawing Sheets

(56) References Cited

U.S. PATENT DOCUMENTS

| | | | | |
|---|---|---|---|---|
| 2002/0113763 | A1* | 8/2002 | Koyama | G09G 3/3648 345/87 |
| 2005/0168490 | A1* | 8/2005 | Takahara | G09G 3/2014 345/690 |
| 2006/0062483 | A1* | 3/2006 | Kondo | G11C 7/1006 382/253 |
| 2007/0132674 | A1* | 6/2007 | Tsuge | G09G 3/2014 345/77 |
| 2008/0019159 | A1* | 1/2008 | Song | G09G 3/3688 363/62 |
| 2009/0153592 | A1* | 6/2009 | Choi | G09G 3/2003 345/690 |
| 2014/0111564 | A1* | 4/2014 | Jeon | G09G 3/3648 345/691 |
| 2014/0125639 | A1* | 5/2014 | Cho | G09G 3/20 345/204 |
| 2014/0160182 | A1* | 6/2014 | Hong | G09G 3/3696 345/691 |
| 2014/0376906 | A1 | 12/2014 | Willcocks et al. | |
| 2017/0195596 | A1* | 7/2017 | Vogelsang | H04N 5/35581 |

FOREIGN PATENT DOCUMENTS

| | | |
|---|---|---|
| KR | 1020110070549 | 6/2011 |
| KR | 1020130057704 | 3/2013 |

* cited by examiner

TOTAL COUNT:2159 X 3
=6477

TOTAL COUNT:2159 X 2
=4318

DISPLAY APPARATUS AND A METHOD OF DRIVING THE SAME

CROSS-REFERENCE TO RELATED APPLICATION

This application claims priority under 35 U.S.C. § 119 to Korean Patent Application No. 10-2015-0078671, filed on Jun. 3, 2015, in the Korean Intellectual Property Office, the disclosure of which is incorporated by reference herein in its entirety.

TECHNICAL FIELD

Exemplary embodiments of the present inventive concept relate to a display apparatus, and more particularly to a method of driving the display apparatus.

DISCUSSION OF THE RELATED ART

A liquid crystal display (LCD) apparatus is used in monitors, laptop computers, cellular phones, or the like, due to its small size and low power consumption. The LCD apparatus includes an LCD panel displaying images.

The LCD panel includes an array substrate having a plurality of gate lines, a plurality of data lines, a plurality of gate lines, a plurality of thin film transistors, and corresponding pixel electrodes. The liquid display panel also includes an opposing substrate having a common electrode. A liquid crystal layer is interposed between the array substrate and the opposing substrate.

As a size of the liquid display panel increases, an amount of a resistance-capacitance (RC) time delay occurring at the data and gate lines thereof is increased, and thus, data and gate signals can be delayed.

For example, the effect of the RC time delay may be greater at a display area farther away from the gate driving part outputting the gate signals. Since a charging period of a pixel is controlled by a gate signal, a charging rate on the pixel at a specific display area may be decreased due to the increased RC time delay. Thus, display quality of the LCD apparatus may be decreased.

BRIEF SUMMARY OF THE INVENTION

According to an exemplary embodiment of the present inventive concept, a display apparatus is provided. The display apparatus includes a display panel, a memory, a bit-data convertor, a switch, and a gate driver. The display panel includes a plurality of pixels. Each of the plurality of pixels is connected to one of a plurality of data lines and one of a plurality of gate lines. The memory stores a plurality of image data corresponding to a frame period. The bit-data convertor determines a plurality of k-bit data. Each of the plurality of k-bit data corresponds to a degree of change between adjacent image data to be applied to one of the data lines among the plurality of image data, obtains a sum of the plurality of k-bit data, and outputs the sum of the k-bit data as a total count bit data value. The switch is configured to output a first pulse control signal corresponding to the total count bit data value ('k' is a natural number greater than zero). The gate driver generates a gate signal based on the first pulse control signal, and to output the gate signal to one of the gate lines.

The bit-data convertor may determine the plurality of k-bit data by determining a level of each of the plurality of image data based on a reference grayscale and determining a difference between a level of one of the adjacent image data and a level of another one of the adjacent image data.

The switch may be configured to output the first pulse control signal decreased when the total count bit data value is increased.

The display apparatus may further include a comparator. The comparator may compare the total count bit data value with a reference count value, and generate selection control data to control the switch based on a comparison result.

The selection control data may be 2-bit data.

The display apparatus may further include a mapping table. The mapping table may store a plurality of pulse control signals including the first pulse control signal. The plurality of pulse control signals may have different rising periods from each other and a same falling period as each other.

The pulse control signals may have different pre-charging periods from each other and a same main-charging period as each other. The pre-charging periods may be periods in which a present horizontal line may be charged with a data voltage of a previous horizontal line, and the main-charging period may be a period in which the present horizontal line may be charged with the data voltage of the present horizontal line.

The switch may be configured to output the first pulse control signal including the pre-charging period decreased when the total count bit data value is increased.

According to an exemplary embodiment of the present inventive concept, a method of driving a display apparatus is provided. The method includes receiving a plurality of image data, determining a plurality of k-bit data each of which corresponds to a degree of change between adjacent image data to be applied to a data line among the plurality of image data ('k' is a natural number greater than zero), obtaining a sum of the plurality of k-bit data, outputting the sum of the k-bit data as a total count bit data value, selecting a pulse control signal corresponding to the total count bit data value of a plurality of pulse control signals, and generating a gate signal based on the selected pulse control signal.

The determining of the plurality of k-bit data may include determining a level of each of the plurality of image data based on a reference grayscale. Each of the plurality of k-bit data may be determined based on a difference between a level of one of the adjacent image data and a level of another one of the adjacent image data.

The method may further include comparing the total count bit data value with a reference count value, generating selection control data result to control a switch based on a comparison result, and outputting one of the plurality of pulse control signals based on the selection control data.

The plurality of pulse control signals may be stored as a mapping table.

The pulse control signals may have different pre-charging periods from each other and a same main-charging period as each other. The pre-charging periods may be periods in which a present horizontal line may be charged with a data voltage of a previous horizontal line, and the main-charging period may be a period in which the present horizontal line may be charged with the data voltage of the present horizontal line.

The selected pulse control signal may have the pre-charging period decreased when the total count bit data value is increased.

According to an exemplary embodiment of the present inventive concept, a display apparatus is provided. The display apparatus includes a display panel, a memory, a pulse control signal generator, and a gate driver. The display panel includes a plurality of pixels. Each of the pixels is connected to one of a plurality of data lines and one of a plurality of gate lines. The memory stores a first plurality of image data corresponding to a first frame period and a second plurality of image data corresponding to a second frame period. The pulse control signal generator generates a first pulse control signal corresponding to the first frame period based on a difference in grayscale between adjacent image data of the first plurality of image data, and generates a second pulse control signal corresponding to the second frame period based on a difference in grayscale between adjacent image data of the second plurality of image data. The gate driver generates a first gate signal corresponding to the first frame period based on the first pulse control signal, and generates a second gate signal corresponding to the second frame period based on the second pulse control signal. A pre-charging period of the first gate signal is different from a pre-charging period of the second gate signal.

The pulse control signal generator may include a bit-data convertor and a switch. The bit-data convertor may determine a first plurality of bit data, obtain a sum of the first plurality of bit data, and output the sum of the first plurality of bit data as a first total count bit data value. The switch may output the first pulse control signal based on the first total count bit data value. Each of the first plurality of bit data may correspond to the difference in grayscale between the corresponding adjacent image data of the first plurality of image data.

The bit-data convertor may additionally determine a second plurality of bit data, obtain a sum of the second plurality of bit data, and output the sum of the second plurality of bit data as a second total count bit data value. The switch may additionally output the second pulse control signal based on the second total count bit data value. Each of the second plurality of bit data may correspond to the difference in grayscale between the corresponding adjacent image data of the second plurality of image data.

The pre-charging period of the first gate signal may be smaller than the pre-charging period of the second gate signal when the first count bit data value is greater than the second total count bit data value.

The display apparatus may further include a comparator. The comparator may compare the first total count bit data value with a reference count value, and generate selection control data to control the switch based on a comparison result.

The display apparatus may further include a mapping table. The mapping table may store the first and second pulse control signals. The first and second pulse control signals may have different rising periods from each other and a same falling period as each other.

BRIEF DESCRIPTION OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
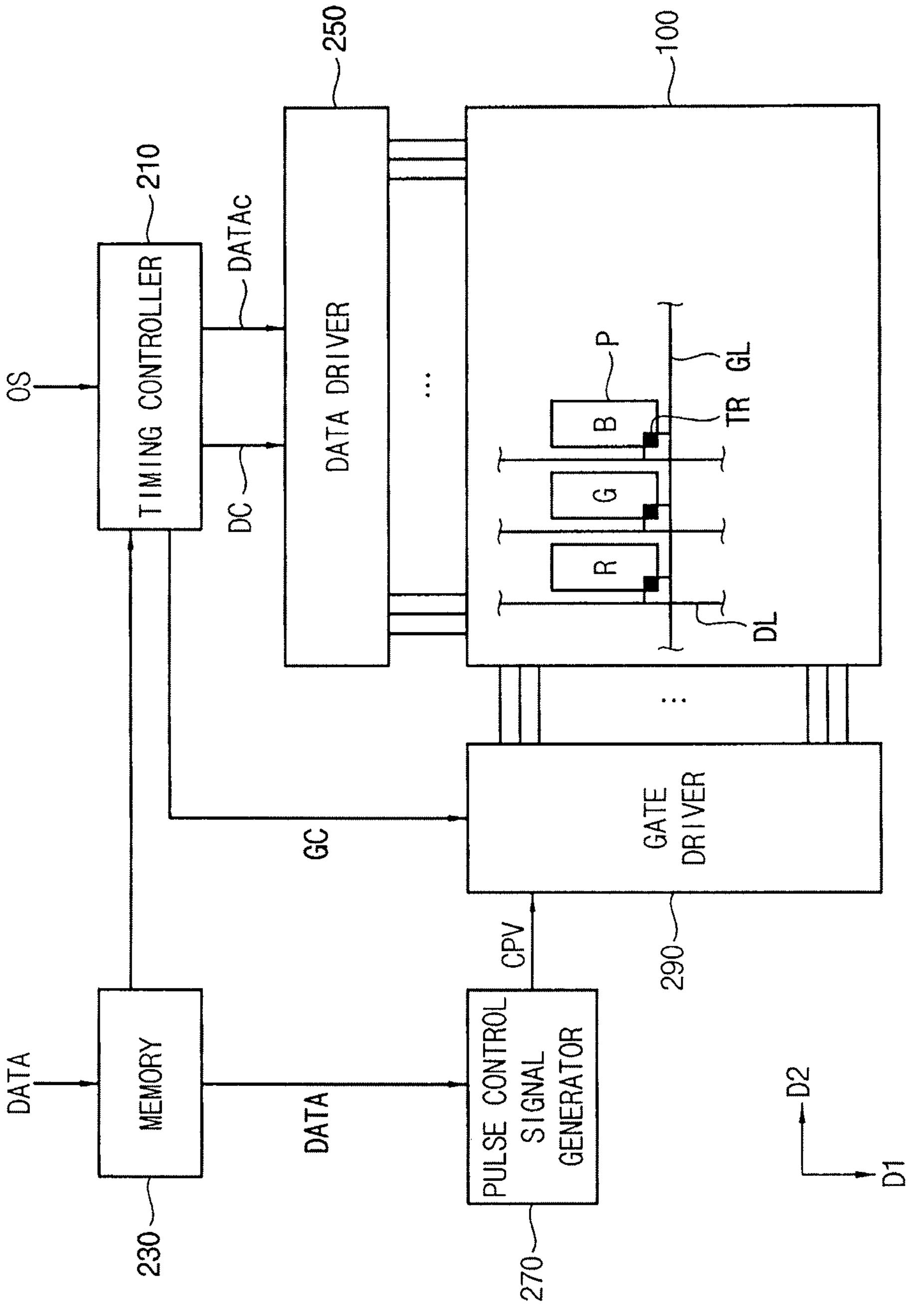
FIG. 1 is a block diagram illustrating a display apparatus according to an exemplary embodiment of the present inventive concept.

Hereinafter, exemplary embodiments of the present inventive concept will be described more fully with reference to the accompanying drawings. The present inventive concept may, however, be embodied in many different forms and should not be construed as being limited to the embodiments set forth herein.

In the drawings, the sizes and the thicknesses of layers and regions may be exaggerated for clarity. Like reference numerals may refer like elements throughout the written descriptions and drawings.

Figure 2A:
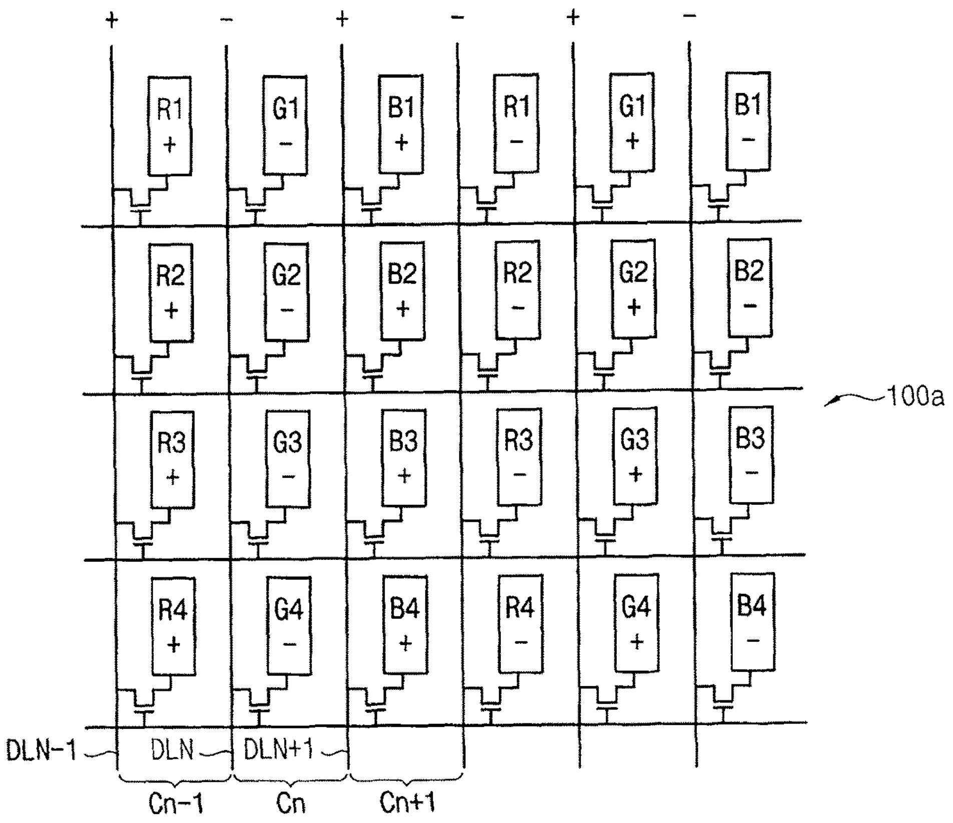
FIGS. 2A and 2B are diagrams illustrating a display panel according to an exemplary embodiment of the present inventive concept.
Figure 2B:
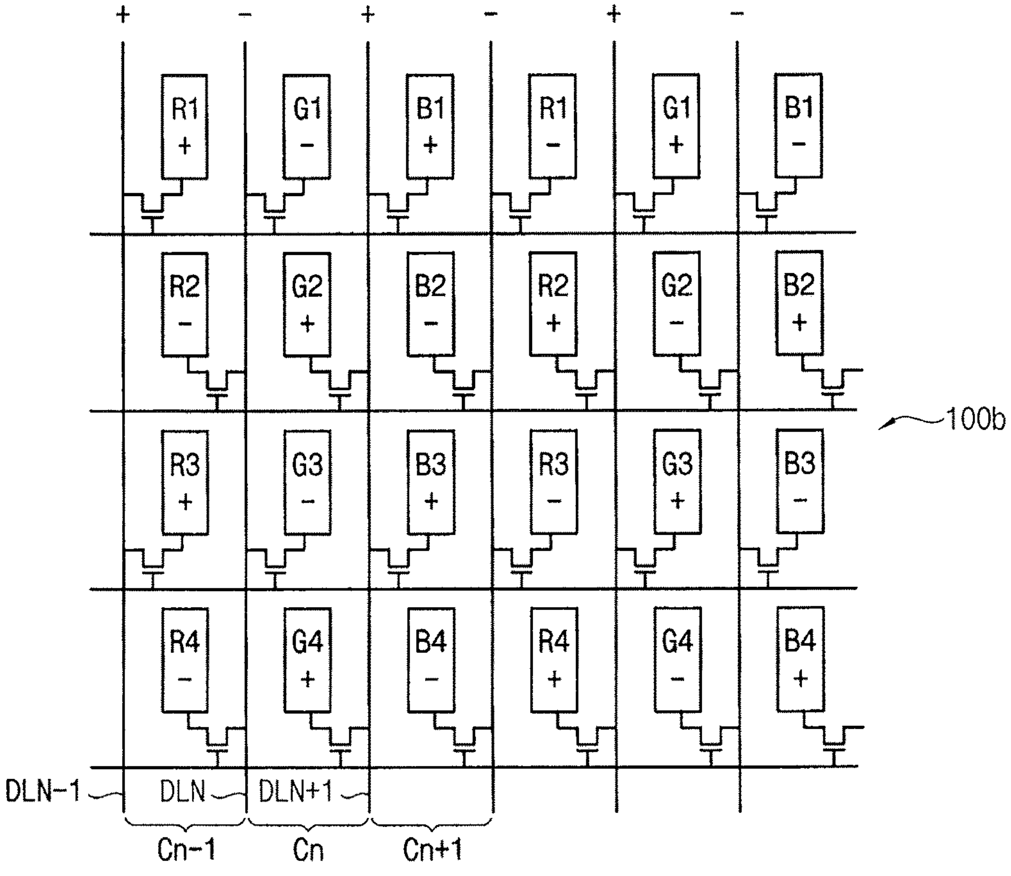

FIG. 1 is a block diagram illustrating a display apparatus according to an exemplary embodiment of the present inventive concept. FIGS. 2A and 2B are diagrams illustrating a display panel according to an exemplary embodiment of the present inventive concept.

Referring to FIG. 1, the display apparatus may include a display panel 100, a timing controller 210, a memory 230, a data driver 250, a pulse control signal generator 270 and a gate driver 290.

The display panel 100 may include a plurality of pixels P which is arranged as a matrix form, a plurality of data lines DL, and a plurality of gate lines GL. The plurality of pixels P may include red, green and blue pixels R, G and B. Each of the plurality of pixels P may include a switching element TR which is connected to a corresponding one of the data lines DL and a corresponding one of the gate lines GL. The data lines DL extend in a first direction D1 and are arranged in a second direction D2 crossing the first direction D1. The gate lines GL extend in the second direction D2 and are arranged in the first direction D1.

As shown in FIG. 2A, a display panel 100*a* according to an exemplary embodiment of the present inventive concept may have a non-alternateness type. For example, the display panel 100*a* of the non-alternateness type includes an (n−1)-th pixel column Cn−1, an n-th pixel column Cn and an (n+1)-th pixel column Cn+1. The (n−1)-th pixel column Cn−1 includes red pixels R1, R2, R3 and R4 which are connected to an (N−1)-th data line DLN−1. The n-th pixel column Cn includes green pixels G1, G2, G3 and G4 which are connected to an N-th data line DLN. The (n+1)-th pixel column Cn+1 includes blue pixels B1, B2, B3 and B4 which are connected to an (N+1)-th data line DLN+1. Thus, the (N−1)-th data line DLN−1 transfers a red data voltage corresponding to the red pixels R1, R2, R3 and R4, the N-th data line DLN transfers a green data voltage corresponding to the green pixels G1, G2, G3 and G4, and the (N+1)-th data line DLN+1 transfers a blue data voltage corresponding to the blue pixels B1, B2, B3 and B4 (here, 'n' and 'N' are natural numbers greater than zero).

Alternatively, as shown in FIG. 2B, a display panel 100*b* according to an exemplary embodiment of the present inventive concept may have an alternateness type. For example, the display panel 100*b* of the alternateness type includes an (n−1)-th pixel column Cn−1 which has red pixels R1, R2, R3 and R4, an n-th pixel column Cn which has green pixels G1, G2, G3 and G4, and an (n+1)-th pixel column Cn+1 which has blue pixels B1, B2, B3 and B4. Some red pixels among the red pixels R1, R2, R3 and R4 in the (n−1)-th pixel column Cn−1 and some green pixels among the green pixels G1, G2, G3 and G4 in the n-th pixel column Cn are connected to an N-th data line DLN. For example, the N-th data line DLN is connected to the first green pixel G1, the second red pixel R2, the third green pixel G3 and the fourth red pixel R4, and the N-th data line DLN transfers a red data voltage corresponding to the second red pixel R2 and the fourth red pixel R4 and a green data voltage corresponding to the first green pixel G1 and the third green pixel G3. In addition, other pixels among the green pixels G1, G2, G3 and G4 in the n-th pixel column Cn and other blue pixels among the blue pixels B1, B2, B3 and B4 in the (n+1)-th pixel column Cn+1 are connected to an (N+1)-th data line DLN+1. For example, the (N+1)-th data line DLN+1 is connected to the first blue pixel B1, the second green pixel G2, the third blue pixel B3 and the fourth green pixel G4, and the (N+1)-th data line DLN+1 transfers a green data voltage corresponding to the first blue pixel B1 and the third blue pixel B3 and a blue data voltage corresponding to the second green pixel G2 and the fourth green pixel G4.

The timing controller 210 is configured to receive a synch signal OS and generate a data control signal DC for controlling the data driver 250 and a gate control signal GC for controlling the gate driver 290, based on the synch signal OS. The timing controller 210 is configured to compensate image data DATA read-out from the memory 230 using a compensation algorithm and provide the compensated data DATAc to the data driver 250.

The memory 230 is configured to store the image data DATA by a unit of a single frame. For example, the memory 230 may store first through m-th plurality of image data each of which may correspond to each of first through m-th frames (here, 'm' is a natural number greater than zero).

The data driver 250 is configured to convert the compensated data DATAc into a data voltage based on the data control signal DC and provide the data voltage to the data line DL.

The pulse control signal generator 270 is configured to determine a plurality of bit data each of which corresponds to a degree of change between adjacent image data to be applied to a particular data line among the m-th plurality of image data, to calculate a total count bit data value by adding the plurality of bit data corresponding to the data line to each other, and to generate a pulse control signal CPV for the m-th frame having a pulse width adjusted based on the total count bit data value.

For example, when a degree of change of the image data to be applied to a data line is smaller than a reference value, the pulse control signal generator 270 is configured to generate a pulse control signal CPV having a relatively long pulse width, which, e.g., corresponds to a relatively long pre-charging period. In addition, when a degree of change of the image data to be applied to a data line is larger than the reference value, the pulse control signal generator 270 is configured to generate a pulse control signal CPV having a relatively short pulse width, which, e.g., corresponds to a relatively short pre-charging period. The pre-charging period is a period in which a present horizontal line is charged with a data voltage of a previous horizontal line, and a main-charging period is a period in which the present horizontal line is charged with the data voltage of the present horizontal line.

Therefore, an image pattern which causes a horizontal line defect generating a color mixture is estimated by detecting the degree of change of the image data corresponding to applied to the data line, and thus, an amount of pre-charging horizontal lines in the display panel 100 is adjusted based the image pattern such that the horizontal line defect generating a color mixture may be reduced.

The gate driver 290 is configured to generate a plurality of gate signals using the pulse control signal CPV provided from the pulse control signal generator 270 and the gate control signal GC provided from the timing controller 210. The gate driver 290 may generate the plurality of gate signals having different pulse widths from each other for each frame based on the pulse control signal CPV. The pulse control signal CPV is generated to have different pre-charging periods from each other for each frame.

Figure 3:
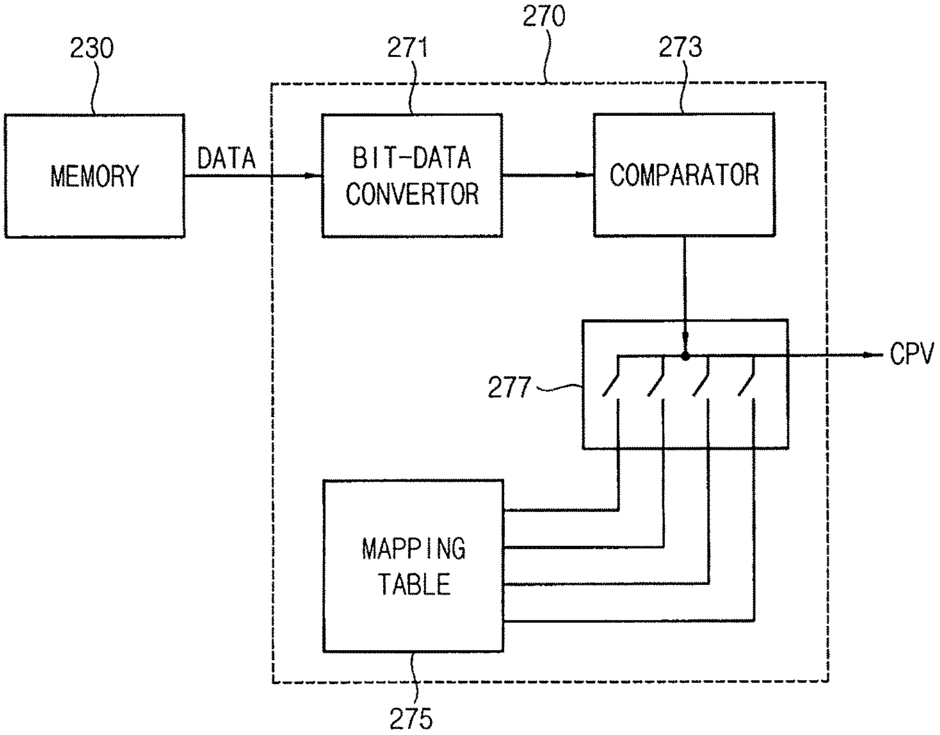
FIG. 3 is a block diagram illustrating a pulse control signal generator according to an exemplary embodiment of the present inventive concept.

FIG. 3 is a block diagram illustrating a pulse control signal generator according to an exemplary embodiment of the present inventive concept.

Referring to FIGS. 1 and 3, the pulse control signal generator 270 may include a bit-data convertor 271, a comparator 273, a mapping table 275 and a switch 277.

The bit-data convertor 271 is configured to determine levels of a plurality of image data to be applied to a data line among m-th frame data provided from the memory 230 based on a plurality of reference grayscales, and determine a plurality of k-bit data each corresponding to a degree of change in level between adjacent image data (here, 'k' is a natural number greater than zero). The bit-data convertor 271 is configured to add the plurality of k-bit data corresponding to the data line to each other and to output the added k-bit data as a total count bit data value.

For example, when the plurality of image data includes 0-grayscale to 255-grayscale (e.g., 256 grayscales in total), the bit-data convertor 271 is configured to divide the plurality of image data into four levels based on a first reference grayscale Gray_1, a second reference grayscale Gray_2 and a third reference grayscale Gray_3.

For example, when a grayscale of a first image data of the plurality of image data is more than the first reference grayscale Gray_1, a level of the first image data is determined to be a fourth level (e.g., "11" in binary). In addition, for example, when a grayscale of a second image data of the plurality of image data is less than the first reference grayscale Gray_1 and more than the second reference grayscale Gray_2, a level of the second image data is determined to be a third level (e.g., "10" in binary). In addition, for example, when a grayscale of a third image data of the plurality of image data is less than the second reference grayscale Gray_2 and more than the third reference grayscale Gray_3, a level of the third image data is determined to be a second level (e.g., "01" in binary). In addition, for example, when a grayscale of a fourth image data of the plurality of image data is less than the third reference grayscale Gray_3, a level of the fourth image data is determined to be a first level (e.g., "00" in binary).

When a difference in level between first adjacent image data is the three levels (e.g., when one of the first adjacent image data has the first level and another one of the first adjacent image data has the fourth level), the bit-data convertor 271 is configured to determine 2-bit data of "11" for the first adjacent image data. When a difference in level between second adjacent image data is two levels (e.g., when one of the second adjacent image data has the second level and another one of the second adjacent image data has the fourth level), the bit-data convertor 271 is configured to determine the 2-bit data of "10" for the second adjacent image data. When a difference in level between third adjacent image data is a single level (e.g., when one of the third adjacent image data has the third level and another one of the third adjacent image data has the fourth level), the bit-data convertor 271 is configured to determine the 2-bit data of "01" for the third adjacent image data. When a difference in level between fourth adjacent image data is a zero level (e.g., when one of the adjacent image data has the same level as that of another image data of the fourth adjacent image data), the bit-data convertor 271 is configured to determine the 2-bit data of "00" for the fourth adjacent image data.

The bit-data convertor 271 is configured to add the plurality of 2-bit data corresponding to the data line to each other and output the added 2-bit data as the total count bit data value corresponding to the data line.

The comparator 273 is configured to compare the total count bit data value corresponding to the data line with each of a plurality of reference count values, and to output a plurality of section control data for controlling the switch 277. Each of the plurality of section control data may be 2-bit data.

For example, when the total count bit data value corresponding to the data line is more than a first reference count value Count_1, the comparator 273 outputs "11" in binary as the section control data. When the total count bit data value corresponding to the data line is less than the first reference count value Count_1 and more than a second reference count value Count_2, the comparator 273 outputs "10" in binary as the section control data. When the total count bit data corresponding to the data line is less than the second reference count value Count_2 and more than a third reference count value Count_3, the comparator 273 outputs "01" in binary as the section control data. When the total count bit data value corresponding to the data line is less than the third reference count value Count_3, the comparator 273 outputs "00" in binary as the section control data.

The mapping table 275 is configured to store a plurality of pulse control signals CPV which has different rising periods from each other and has the same falling period as each other. The mapping table 275 is configured to provide the switch 277 with the plurality of pulse control signals.

The switch 277 is configured to select one of the plurality of pulse signals provided from the mapping table 275 based on the section control data provided from the comparator 273, and to output the selected pulse control signal as a pulse control signal CPV to the gate driver.

For example, when the section control data is "00" in binary, the switch 277 selects and outputs a first pulse control signal of the plurality of pulse control signals as the pulse control signal CPV. When the section control data is "01" in binary, the switch 277 selects and outputs a second pulse control signal of the plurality of pulse control signals as the pulse control signal CPV. When the section control data is "10" in binary, the switch 277 selects and outputs a third pulse control signal of the plurality of pulse control signals as the pulse control signal CPV. When the section control data is "11", the switch 277 selects and outputs a fourth pulse control signal of the plurality of pulse control signals as the pulse control signal CPV.

For example, the first pulse control signal has a first pulse including a first pre-charging period and a main-charging period, the second pulse control signal has a second pulse including a second pre-charging period shorter than the first pre-charging period and the main-charging period, the third pulse control signal has a third pulse including a third pre-charging period shorter than the second pre-charging period and the main-charging period, and the fourth pulse control signal has a fourth pulse including a fourth pre-charging period shorter than the third pre-charging period and the main-charging period.

Therefore, when the total count bit data value corresponding to the data line is increased, the pre-charging period of the pulse control signal CPV is decreased, and thus, the horizontal line defect generating a color mixture is reduced.

Figure 4:
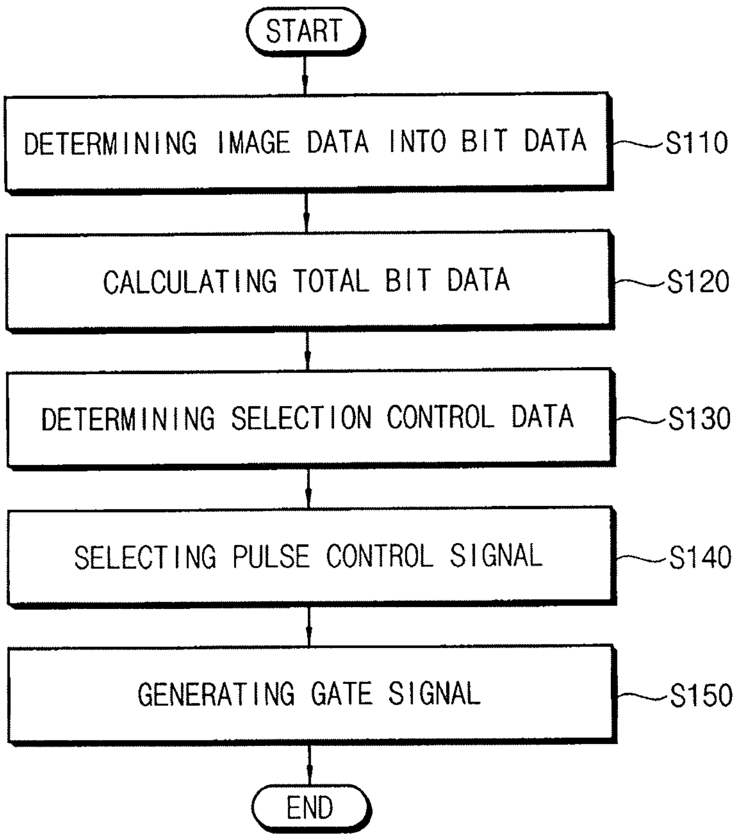
FIG. 4 is a flowchart illustrating a method of driving a display apparatus according to an exemplary embodiment of the present inventive concept.
Figure 5A:
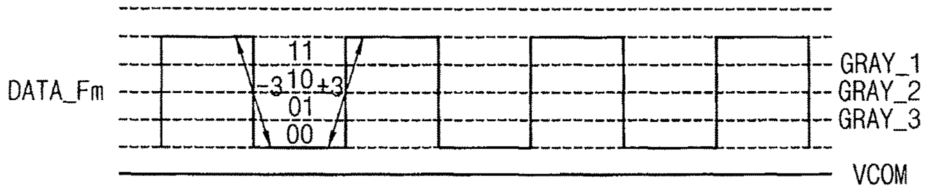
FIGS. 5A to 5C are diagrams illustrating image data corresponding to a frame period according to an exemplary embodiment of the present inventive concept.
Figure 5B:
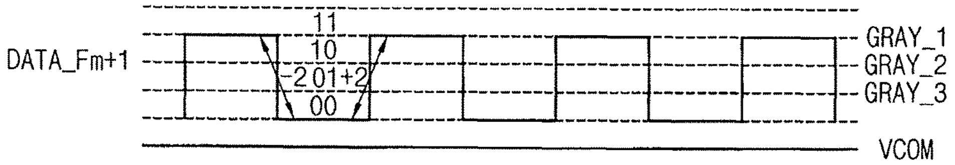
Figure 5C:
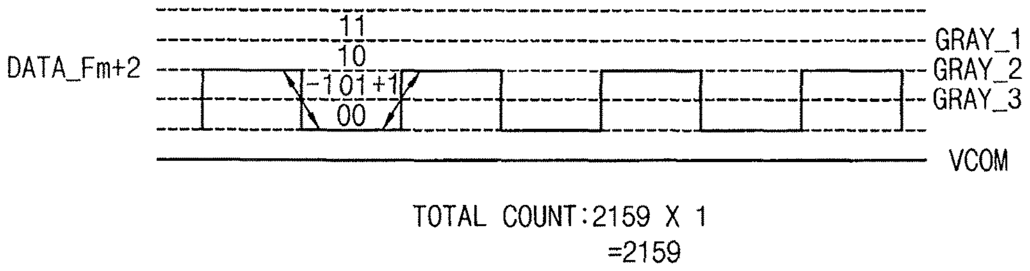
Figure 6:
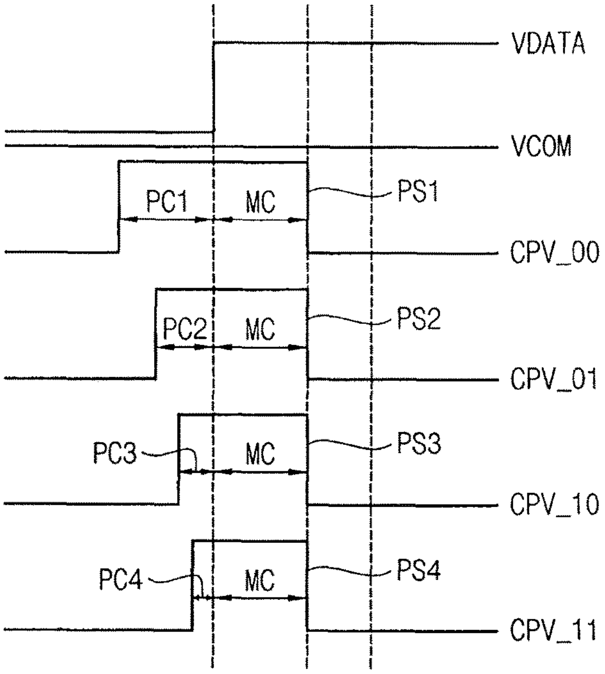
FIG. 6 is a diagram illustrating a mapping table according to an exemplary embodiment of the present inventive concept.
Figure 7:
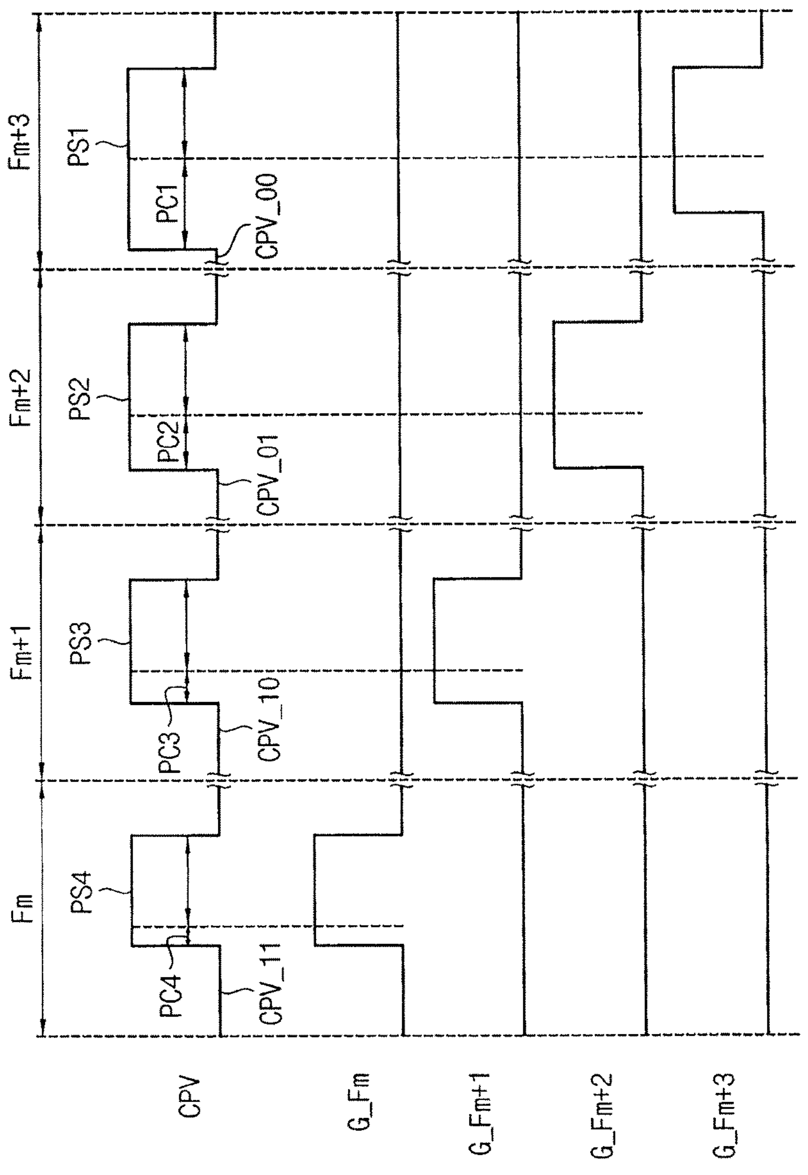
FIG. 7 is a diagram illustrating a switch according to an exemplary embodiment of the present inventive concept.

FIG. 4 is a flowchart illustrating a method of driving a display apparatus according to an exemplary embodiment of the present inventive concept. FIGS. 5A to 5C are diagrams illustrating image data corresponding to a frame period according to an exemplary embodiment of the present inventive concept. FIG. 6 is a diagram illustrating a mapping table according to an exemplary embodiment of the present inventive concept. FIG. 7 is a diagram illustrating a switch according to an exemplary embodiment of the present inventive concept.

Referring to FIGS. 3 and 4, the bit-data convertor 271 is configured to determine each of a plurality of image data corresponding to a particular data line to one of four levels based on a plurality of reference grayscales, and to determine a plurality of k-bit data (e.g., k is 2) each corresponding to a difference in level between adjacent image data of the plurality of image data (Step S110).

The bit-data convertor 271 is configured to add a plurality of k-bit data (e.g., k is 2) corresponding to the data line and output the added k-bit data as a total count bit data value (Step S120).

For example, FIG. 5A is a waveform diagram illustrating image data DATA_Fm corresponding to an m-th frame to be applied to a particular data line. FIG. 5B is a waveform diagram illustrating image data DATA_Fm+1 corresponding to an (m+1)-th frame data to be applied to the data line. FIG. 5C is a waveform diagram illustrating image data DATA_Fm+2 corresponding to an (m+2)-th frame data to be applied to the data line. Referring to FIGS. 5A to 5C, it is assumed that the image data may correspond to grayscales ranged over 0 to at most 255, and a resolution of the display panel is "3840×2160".

Referring to FIG. 5A, the plurality of image data DATA_Fm (e.g., the m-th frame data) swings between image data corresponding to the 0-grayscale and image data corresponding to a grayscale (e.g., the 255-grayscale) more than a first reference grayscale Gray_1. The bit-data convertor 271 is configured to determine the image data corresponding to the 0-grayscale as a first level (e.g., "00" in binary) and the image data corresponding to the grayscale (e.g., the 255-grayscale) more than the first reference grayscale Gray_1 as a fourth level (e.g., "11" in binary), based on the first to third reference grayscales Gray_1, Gray_2 and Gray_3. A difference in level between adjacent image data of the plurality of image data DATA_Fm corresponds to three levels, and thus, the bit-data convertor 271 is configured to determine bit data corresponding to the difference in level as "11" (e.g., "3" in decimal). The plurality of image data DATA_Fm corresponding to the data line may include the image data of 2160 pixels, and thus, the total count bit data value corresponding to the m-th frame may be "6477" (=2159×3). For example, the plurality of image data DATA_Fm may include a plurality of adjacent image data of "2159", and the bit data of "11" (e.g., "3" in decimal) is set to each of the plurality of adjacent images of "2159", and thus, the total count bit data value obtained by adding the "11" (e.g., "3" in decimal) bit data "2159" times may be "6477" (=2159×3).

Referring to FIG. 5B, the plurality of image data DATA_Fm+1 (e.g., the (m+1)-th frame data) swings between the image data corresponding to the 0-grayscale and image data corresponding to a gray scale (e.g., 150-grayscale) between the first reference grayscale Gray_1 and the second reference grayscale Gray_2. The bit-data convertor 271 is configured to determine the image data corresponding to the 0-grayscale as the first level (e.g., "00" in binary) and the image data corresponding to the grayscale (e.g., the 150-grayscale) between the first reference grayscale Gray_1 and the second reference grayscale Gray_2 as a third level (e.g., "10" in binary), based on the first to third reference grayscales Gray_1, Gray_2 and Gray_3. A difference in level between adjacent image data of the plurality of image data DATA_Fm+1 corresponds to two levels, and thus, the bit-data convertor 271 is configured to determine bit data corresponding to the difference in level as "10" (e.g., "2" in decimal). The plurality of image data DATA_Fm+1 corresponding to the data line may include the image data of 2160 pixels, and thus, the total count bit data value corresponding to the (m+1)-th frame may be "4318" (=2159×2). For example, the plurality of image data DATA_Fm+1 may include a plurality of adjacent image data of "2159", and the bit data of "10" (e.g., "2" in decimal) is set to each of the plurality of adjacent images of "2159", and thus, the total count bit data value obtained by adding the "10" (e.g., "2" in decimal) bit data "2159" times may be "4318" (=2159×2).

Referring to FIG. 5C, the plurality of image data DATA_Fm+2 (e.g., the (m+2)-th frame data) swings between the image data corresponding to the 0-grayscale and image data corresponding to a grayscale (e.g., the 100-grayscale) between the second reference grayscale Gray_2 and the third reference grayscale Gray_3. The bit-data convertor 271 is configured to determine the image data corresponding to the 0-grayscale as the first level (e.g., "00" in binary) and the image data of the grayscale (e.g., the 100-grayscale) between the second reference grayscale Gray_2 and the third reference grayscale Gray_3 as a second level (e.g., "01" in binary), based on the first to third reference grayscales Gray_1, Gray_2 and Gray_3. A difference in level between adjacent image data of the plurality of image data DATA_Fm+2 corresponds to a single level, and thus, the bit-data convertor 271 is configured to determine bit data corresponding to the difference in level as "01" (e.g., "1" decimal). The plurality of image data DATA_Fm+2 corresponding to the data line may include the image data of 2160 pixels, and thus, the total count bit data value corresponding to the (m+2)-th frame may be "2159" (=2159×1). For example, the plurality of image data DATA_Fm+2 may include a plurality of adjacent image data of "2159", and the bit data of "01" (e.g., "1" in decimal) is set to each of the plurality of adjacent images of "2159", and thus, the total count bit data value obtained by adding the "01" (e.g., "1" in decimal) bit data "2159" times may be "2159" (=2159×1).

The comparator 273 is configured to compare the total count bit data value corresponding to the data line with each of a plurality of reference count values, and determine and output a plurality of section control data for controlling the switch 277 (Step S130).

For example, when the total count bit data value is more than a first reference count value Count_1 (e.g., "6477"), the section control data is determined as "11" in binary. In addition, when the total count bit data value is less than the first reference count value Count_1 (e.g., "6477") and more than a second reference count value Count_2 (e.g., "4318"), the section control data is determined as "10" in binary. In addition, when the total count bit data value is less than the second reference count value Count_2 (e.g., "4318") and more than a third reference count value Count_3 (e.g., "2159"), the section control data is determined as "01" in binary. When the total count bit data value is less than the third reference count value Count_3 (e.g., "2159"), the section control data is determined as "00" in binary.

Referring to FIG. 5A, the total count bit data value of the m-th frame data is more than the first reference count value Count_1 (e.g., "6477"), and thus, the comparator 273 is configured to determine the section control data of the m-th frame data as "11" in binary.

Referring to FIG. 5B, the total count bit data value of the (m+1)-th frame is more than the second reference count value Count_2 (e.g., "4318"), and thus, the comparator 273 is configured to determine the section control data of the (m+1)-th frame data as "10" in binary.

Referring to FIG. 5C, the total count bit data value of the (m+2)-th frame data is more than the third reference count value Count_3 (e.g., "2159"), the comparator 273 is configured to determine the section control data of the (m+2)-th frame data as "01" in binary.

In addition, the total count bit data value of a (m+3)-th frame data is less than the third reference count value Count_3 (e.g., "2159"), the comparator 273 is configured to determine the section control data of the (m+3)-th frame data as "00" in binary.

The switch 277 is configured to select one of the plurality of pulse control signals CPV_00, CPV_01, CPV_10 and CPV_11 provided from the mapping table 275 based on the section control data provided from the comparator 273 (Step S140).

Referring to FIG. 6, when the section control data is "00" in binary, the switch 277 is configured to select and output a first pulse control signal CPV_00. When the section control data are "01" in binary, the switch 277 is configured to select and output a second pulse control signal CPV_01. When the section control data are "10" in binary, the switch 277 is configured to select and output a third pulse control signal CPV_10. When the section control data are "11" in binary, the switch 277 is configured to select and output a fourth pulse control signal CPV_11.

For example, the first pulse control signal CPV_00 has a first pulse PS1 including a first pre-charging period PC1 and a main-charging period MC, the second pulse control signal CPV_01 has a second pulse PS2 including a second pre-charging period PC2 shorter than the first pre-charging period PC1 and the main-charging period MC, the third pulse PS3 control signal CPV_10 has a third pulse including a third pre-charging period PC3 shorter than the second pre-charging period PC2, and the main-charging period MC and the fourth pulse control signal CPV_11 has a fourth pulse PS4 including a fourth pre-charging period PC4 shorter than the third pre-charging period PC3 and the main-charging period MC.

The switch 277 is configured to select and output the fourth pulse control signal CPV_11 corresponding to the m-th frame data, to select and output the third pulse control signal CPV_10 corresponding to the (m+1)-th frame data, to select and output the second pulse control signal CPV_01 corresponding to the (m+2)-th frame data, and to select and output the first pulse control signal CPV_00 corresponding to the (m+3)-th frame data.

Referring to FIGS. 4 and 7, the gate driver (e.g., '290' of FIG. 1) is configured to generate a plurality of gate signals based on the pulse control signal CPV provided from the switch 277 (Step S150).

Referring to FIGS. 5A to 5C, during the m-th frame Fm, the gate driver 290 is configured to generate a gate signal G_Fm having a period corresponding to the fourth pre-charging period PC4 based on the fourth pulse control signal CPV_11.

In addition, during the (m+1)-th frame Fm+1, the gate driver 290 is configured to generate a gate signal G_Fm+1 having a period corresponding to the third pre-charging period PC3 based on the third pulse control signal CPV_10.

In addition, during the (m+2)-th frame Fm+2, the gate driver 290 is configured to generate a gate signal G_Fm+2 having a period corresponding to the second pre-charging period PC2 based on the second pulse control signal CPV_01.

In addition, during the (m+3)-th frame Fm+3, the gate driver 290 is configured to generate a gate signal G_Fm+3 having a period corresponding to the first pre-charging period PC1 based on the first pulse control signal CPV_00.

Therefore, when a total count bit data value corresponding to a particular data line is increased, a pre-charging period of a pulse control signal CPV is decreased, and thus, the horizontal line defect generating a color mixture is reduced.

As described above, according to an exemplary embodiment of the present inventive concept, a pre-charging period of a gate signal may be adjusted for each frame based on a degree of change between adjacent image data of a plurality of image data of a particular frame corresponding to the data line, and thus, the horizontal line defect generating the color mixture may be reduced.

The foregoing is illustrative of the present inventive concept and is not to be construed as limiting thereof. Although a few exemplary embodiments of the present inventive concept have been described, it will be understood that various changes in form and details may be made therein without departing from the spirit and scope thereof.

What is claimed is:

1. A display apparatus comprising:

a display panel including a plurality of pixels, each of which is connected to one of a plurality of data lines and one of a plurality of gate lines;

a memory storing a plurality of image data corresponding to a frame period;

a bit-data convertor determining a plurality of k-bit data ('k' is a natural number greater than zero), each one k-bit data corresponds to a degree of change between adjacent image data to be applied to one of the data lines among the plurality of image data, obtaining a sum of the plurality of k-bit data, and outputting the sum of the k-bit data as a total count bit data value;

a switch configured to output a first pulse control signal corresponding to the total count bit data value; and a gate driver generating a gate signal based on the first pulse control signal, and outputting the gate signal to one of the plurality of gate lines.

2. The display apparatus of claim 1, wherein the bit-data convertor determines the plurality of k-bit data by determining a level of each of the plurality of image data based on a reference grayscale, and determining a difference between a level of one of the adjacent image data and a level of another one of the adjacent image data.

3. The display apparatus of claim 1, wherein the switch is configured to output the first pulse control signal decreased when the total count bit data value is increased.

4. The display apparatus of claim 1, further comprising:

a comparator comparing the total count bit data value with a reference count value and generating selection control data to control the switch based on a comparison result.

5. The display apparatus of claim 4, wherein the selection control data is 2-bit data.

6. The display apparatus of claim 4, further comprising:

a mapping table storing a plurality of pulse control signals including the first pulse control signal, wherein the plurality of pulse control signals has different rising periods from each other and a same falling period as each other.

7. The display apparatus of claim 6, wherein the pulse control signals have different pre-charging periods from each other and a same main-charging period as each other, wherein the pre-charging periods are periods in which a present horizontal line is charged with a data voltage of a previous horizontal line, and the main-charging period is a period in which the present horizontal line is charged with the data voltage of the present horizontal line.

8. The display apparatus of claim 7, wherein the switch is configured to output the first pulse control signal including the pre-charging period decreased when the total count bit data value is increased.

9. A method of driving a display apparatus, the method comprising:

receiving a plurality of image data;

determining, by a pulse control signal generator, a plurality of k-bit data ('k' is a natural number greater than zero), each one k-bit corresponds to a degree of change between adjacent image data to be applied to a data line among the plurality of image data;

obtaining a sum of the plurality of kbit data;

outputting the sum of the k-bit data as a total count bit data value;

selecting, by a switch, a pulse control signal corresponding to the total count bit data value among a plurality of pulse control signals that is output to a gate driver; and generating, by the gate driver, a gate signal based on the pulse control signal output to at least one of a plurality of gate lines connected to a plurality of pixels of the display apparatus.

10. The method of claim 9, wherein the determining of the plurality of k-bit data including determining a level of each of the plurality of image data based on a reference grayscale, and wherein each of the plurality of kbit data is determined based on a difference between a level of one of the adjacent image data and a level of another one of the adjacent image data.

11. The method of claim 9, further comprising:

comparing the total count bit data value with a reference count value;

generating selection control data based on a comparison result to control a switch; and outputting one of the plurality of pulse control signals based on the selection control data.

12. The method of claim 9, wherein the plurality of pulse control signals is stored as a mapping table.

13. The method of claim 12, wherein the pulse control signals have different pre-charging periods from each other and a same main-charging period as each other, wherein the pre-charging periods are periods in which a present horizontal line is charged with a data voltage of a previous horizontal line, and the main-charging period is a period in which the present horizontal line is charged with the data voltage of the present horizontal line.

14. The method of claim 13, wherein the selected pulse control signal includes the pre-charging period decreased when the total count bit data value is increased.

15. A display apparatus comprising:

a display panel including a plurality of pixels, each of which is connected to one of a plurality of data lines and one of a plurality of gate lines;

a memory storing a first plurality of image data corresponding to a first frame period, and storing a second plurality of image data corresponding to a second frame period;

a pulse control signal generator generating a first pulse control signal corresponding to the first frame period based on a difference in grayscale between adjacent image data of the first plurality of image data, and generating a second pulse control signal corresponding to the second frame period based on a difference in grayscale between adjacent image data of the second plurality of image data; and a gate driver generating a first gate signal corresponding to the first frame period based on the first pulse control signal, and generating a second gate signal corresponding to the second frame period based on the second pulse control signal, wherein a pre-charging period of the first gate signal is different from a pre-charging period of the second gate signal.

16. The display apparatus of claim 15, wherein the pulse control signal generator comprises:

a bit-data convertor determining a first plurality of bit data, each of which corresponds to the difference in grayscale between a corresponding adjacent image data of the first plurality of image data, obtaining a sum of the first plurality of bit data, and outputting the sum of the first plurality of bit data as a first total count bit data value; and a switch outputting the first pulse control signal based on the first total count bit data value.

17. The display apparatus of claim 16, wherein the bit-data convertor additionally determines a second plurality of bit data, each of which corresponds to the difference in grayscale between the corresponding adjacent image data of the second plurality of image data, obtains a sum of the second plurality of bit data, and outputs the sum of the bit data as a second total count bit data value, and wherein the switch additionally outputs the second pulse control signal based on the second total count bit data value.

18. The display apparatus of claim 17, wherein the pre-charging period of the first gate signal is smaller than the pre-charging period of the second gate signal when the first count bit data value is greater than the second total count bit data value.

19. The display apparatus of claim 15, further comprising:

a comparator comparing a first total count bit data value with a reference count value and generating selection control data to control a switch based on a comparison result.

20. The display apparatus of claim 19, further comprising:

a mapping table storing the first and second pulse control signals, and wherein the first and second pulse control signals have different rising periods from each other and a same falling period as each other.

* * * * *